(12) United States Patent
Zheng et al.

(10) Patent No.: US 9,420,467 B2
(45) Date of Patent: Aug. 16, 2016

(54) MOBILE PHONE AND RECEIVED INFORMATION PROCESSING METHOD THEREOF

(75) Inventors: Yu Zheng, Huizhou (CN); Yang Ding, Huizhou (CN)

(73) Assignee: HUIZHOU TCL MOBILE COMMUNICATION CO., LTD., Huizhou, Guangdong Province (CN)

( * ) Notice: Subject to any disclaimer, the term of this patent is extended or adjusted under 35 U.S.C. 154(b) by 20 days.

(21) Appl. No.: 13/979,849

(22) PCT Filed: Dec. 7, 2011

(86) PCT No.: PCT/CN2011/083610
§ 371 (c)(1),
(2), (4) Date: Jul. 15, 2013

(87) PCT Pub. No.: WO2012/122830
PCT Pub. Date: Sep. 20, 2012

(65) Prior Publication Data
US 2013/0303121 A1 Nov. 14, 2013

(30) Foreign Application Priority Data
Mar. 11, 2011 (CN) .......................... 2011 1 0058821

(51) Int. Cl.
*H04M 1/66* (2006.01)
*H04M 1/68* (2006.01)
*H04M 3/16* (2006.01)
(Continued)

(52) U.S. Cl.
CPC .............. *H04W 12/08* (2013.01); *H04W 4/003* (2013.01); *H04W 8/183* (2013.01); *H04M 1/72519* (2013.01); *H04W 4/14* (2013.01); *H04W 12/06* (2013.01)

(58) Field of Classification Search
None
See application file for complete search history.

(56) References Cited

U.S. PATENT DOCUMENTS 6,445,914 B1 * 9/2002 Findikli et al. ................ 455/411
8,224,292 B2 * 7/2012 Kim et al. ..................... 455/411
(Continued)

FOREIGN PATENT DOCUMENTS

CN    1503594 A    6/2004
CN    101252738 A  8/2008
(Continued)

*Primary Examiner* — Marivelisse Santiago Cordero
*Assistant Examiner* — Moustapha Diaby
(74) *Attorney, Agent, or Firm* — Cheng-Ju Chiang

(57) ABSTRACT

Disclosed are a mobile phone and a method for processing received information thereof. The method comprises the following steps: determining whether received information under current processing is from a secondary subscriber identity module (SIM) card of the mobile phone, and determining whether the secondary SIM card is locked; if the received information is from the secondary SIM card of the mobile phone and the secondary SIM card is locked, waiting for a subscriber to determine whether to process, through a primary SIM card of the mobile phone, the received information; and if the subscriber determines to process, through the primary SIM card of the mobile phone, the received information, processing the received information through the primary SIM card. In the present invention, when the secondary SIM card in the mobile phone is locked and it is necessary to reply to or forward a short message on the secondary SIM card, received information from the secondary SIM card can be processed in time through the primary SIM card, which is greatly convenient for the use of the subscriber.

6 Claims, 2 Drawing Sheets

(51) Int. Cl.
*H04M 3/42* (2006.01)
*H04W 12/08* (2009.01)
*H04W 8/18* (2009.01)
*H04W 4/00* (2009.01)
H04W 12/06 (2009.01)
H04M 1/725 (2006.01)
H04W 4/14 (2009.01)

(56) References Cited

U.S. PATENT DOCUMENTS

2007/0082705 A1* 4/2007 Jain et al. .............. 455/558
2008/0064443 A1* 3/2008 Shin et al. .............. 455/558
2010/0216428 A1* 8/2010 Jain et al. .............. 455/410
2012/0094718 A1* 4/2012 Kim ........................ 455/559
2012/0135715 A1* 5/2012 Kang et al. ............. 455/412.1
2012/0172011 A1* 7/2012 Gupta et al. ............ 455/414.1

FOREIGN PATENT DOCUMENTS

| CN | 101282543 A | 10/2008 |
| CN | 101282544 A | 10/2008 |
| CN | 101282549 A | 10/2008 |
| CN | 102131184 A | 7/2011 |
| WO | 2010/140781 A2 | 12/2010 |

* cited by examiner

US 9,420,467 B2

MOBILE PHONE AND RECEIVED INFORMATION PROCESSING METHOD THEREOF

FIELD OF THE INVENTION

The present disclosure generally relates to the technical field of communication, and more particularly, to a mobile phone and a received information processing method thereof.

BACKGROUND OF THE INVENTION

With continuous advancement of mobile terminal technologies, users now demand for more and more functions of mobile terminals.

Taking a mobile phone as an example, communication operators generally purchase mobile phones in batches and, through use of the SIMLock technology, restrict users from using Subscriber Identity Module (SIM) cards of other operators in the mobile phones. For example, mobile phones customized for China Mobile Communication Corporation don't allow for use of SIM cards of China Unicom therein.

Although the dual-card-dual-standby and multi-card-multi-standby technologies have appeared, there still lacks a thorough understanding by the operators on how to effectively utilize such technologies. Currently, practices of controlling functions within a mobile phone are all based on the SIMLock specification of the standard 3GPP/3GPP2, and all resources of a mobile phone are treated uniformly: either all functions are allowed to be used by the user or only an emergency call can be made.

Obviously, this represents great inconveniences for the users. Especially when a user needs to reply or forward a short message from a secondary SIM card, it is often the case that the received information cannot be processed in time due to locking out of the secondary SIM card. This has a great influence on use of the mobile phones.

SUMMARY OF THE INVENTION

A primary technical problem to be solved by the present disclosure is to provide a mobile phone and a received information processing method thereof, which are able to process received information from a secondary SIM card of the mobile phone in time even if the secondary SIM card is locked out.

To solve the aforesaid technical problem, one technical solution is proposed by the present disclosure to provide a mobile phone, which comprises an identity (ID) reading module, a primary/secondary card determining module, a determining module, a choosing module, and a received information processing module. The ID reading module is configured to read an ID of each of SIM cards in the mobile phone one by one. The primary/secondary card determining module is configured to determine whether the ID of the SIM card exists in a pre-stored license code list. If the ID of the SIM card exists in the pre-stored license code list, then the SIM card is determined to be a primary SIM card. If the ID of the SIM card does not exist in the pre-stored license code list, then the SIM card is determined to be a secondary SIM card. The determining module is configured to determine whether a short message being processed is from the secondary SIM card of the mobile phone and whether the secondary SIM card is locked out. The choosing module is configured to, if the short message is from the secondary SIM card of the mobile phone and the secondary SIM card is locked out, prompt a user to choose whether to process the short message via the primary SIM card of the mobile phone. The received information processing module is configured to process the short message via the primary SIM card when the user chooses to process the short message via the primary SIM card of the mobile phone.

Preferably, the determining module comprises a destination address acquiring module and a comparing module. The destination address acquiring module is configured to acquire a destination address comprised in the received information. The comparing module is configured to compare the destination address with address information of the primary SIM card, and if the destination address is inconsistent with the address information of the primary SIM card, then it is determined that the received information is from the secondary SIM card.

Preferably, the received information processing module is further configured to set a destination server address of the information being processed as a destination server address of the primary SIM card.

To solve the aforesaid technical problem, another technical solution is proposed by the present disclosure to provide a received information processing method for a mobile phone. The received information processing method for a mobile phone comprises the following steps of: determining whether received information being currently processed is from a secondary SIM card of the mobile phone and determining whether the secondary SIM card is locked out; if the received information is from the secondary SIM card of the mobile phone and the secondary SIM card is locked out, then prompting a user to choose whether to process the received information via a primary SIM card of the mobile phone; and if the user chooses to process the received information via the primary SIM card of the mobile phone, then processing the received information via the primary SIM card.

Preferably, the step of determining whether received information being currently processed is from a secondary SIM card of the mobile phone comprises the following steps of: acquiring a destination address comprised in the received information; and comparing the destination address with address information of the primary SIM card, and if the destination address is inconsistent with the address information of the primary SIM card, then it is determined that the received information is from the secondary SIM card.

Preferably, when the received information is processed via the primary SIM card, a destination server address of the received information being processed is set as a destination server address of the primary SIM card.

Preferably, the received information processing method for a mobile phone further comprises the following steps before the step of determining whether received information being currently processed is from a secondary SIM card of the mobile phone: reading an ID of each of SIM cards in the mobile phone one by one and determining whether the ID of the SIM card exists in a pre-stored license code list; if the ID of the SIM card exists in the pre-stored license code list, then determining that the SIM card is the primary SIM card; and if the ID of the SIM card does not exist in the pre-stored license code list, then determining that the SIM card is the secondary SIM card.

Preferably, the received information is a short message.

To solve the aforesaid technical problem, a further technical solution is proposed by the present disclosure to provide a mobile phone, which comprises a determining module, a choosing module and a received information processing module. The determining module is configured to determine whether received information being processed is from a secondary SIM card of the mobile phone and whether the secondary SIM card is locked out. The choosing module is configured to, if the received information is from the secondary SIM card of the mobile phone and the secondary SIM card is locked out, prompt a user to choose whether to process the received information via a primary SIM card of the mobile phone. The received information processing module is configured to process the received information via the primary SIM card when the user chooses to process the received information via the primary SIM card of the mobile phone.

Preferably, the determining module comprises a destination address acquiring module and a comparing module. The destination address acquiring module is configured to acquire a destination address comprised in the received information. The comparing module is configured to compare the destination address with address information of the primary SIM card, and if the destination address is inconsistent with the address information of the primary SIM card, then it is determined that the received information is from the secondary SIM card.

Preferably, the received information processing module is further configured to set a destination server address of the information being processed as a destination server address of the primary SIM card.

Preferably, the mobile phone further comprises an ID reading module and a primary/secondary card determining module. The ID reading module is configured to read an ID of each of SIM cards in the mobile phone one by one. The primary/secondary card determining module is configured to determine whether the ID of the SIM card exists in a pre-stored license code list: if the ID of the SIM card exists in the pre-stored license code list, then the SIM card is determined to be a primary SIM card; and otherwise, the SIM card is determined to be a secondary SIM card.

Preferably, the received information is a short message.

According to the embodiments of the present disclosure described above, if the secondary SIM card of the mobile phone is locked out and a short message from the secondary SIM card needs to be replied or forwarded, then the received information from the secondary SIM card can be processed via the primary SIM card in time. This represents great convenience for users.

DETAILED DESCRIPTION OF THE INVENTION

To make the objectives, technical solutions and advantages of the present disclosure clearer, the present disclosure will be further described hereinbelow with reference to the attached drawings and embodiments thereof. It shall be understood that, the embodiments described herein are only intended to illustrate but not to limit the present disclosure.

Figure 1:
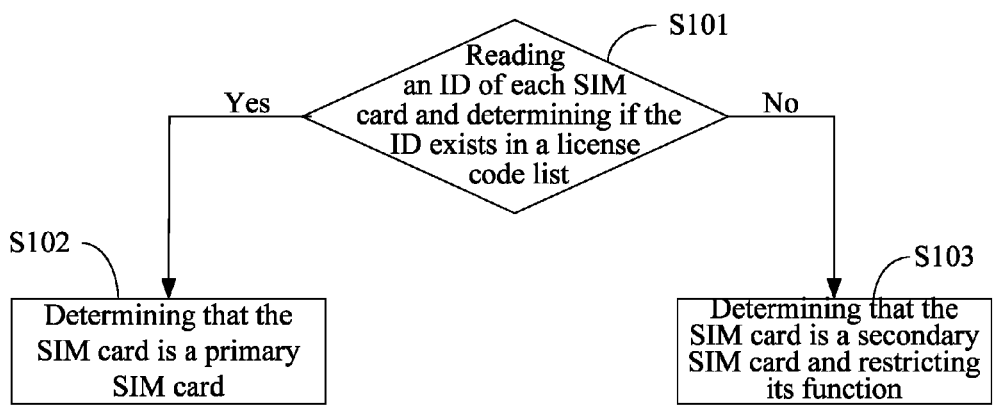
FIG. 1 is a flowchart diagram of a process of determining a primary SIM card and a secondary SIM card according to an embodiment of the present disclosure.

FIG. 1 illustrates a flowchart diagram of a process of determining a primary SIM card and a secondary SIM card according to an embodiment of the present disclosure.

In step S101, an ID of each of SIM cards in a mobile phone is read one by one; and it is determined whether the ID of the SIM card exists in a pre-stored license code list. If the answer is yes, then the method proceeds to step S102; and otherwise, the method proceeds to step S103.

In step S102, the SIM card is determined to be a primary SIM card.

In step S103, the SIM card is determined to be a secondary SIM card and its functions will be restricted.

In practical implementations, the present disclosure mainly acquires the Mobile Network Code (MNC) and the Mobile Country Code (MCC) of each SIM card and then determines whether the MNC and the MCC of each SIM card exists in a license code list. Of course, other IDs of the SIM cards may also be verified and this will not be further enumerated herein.

Of course, if no primary SIM card is found after all SIM cards in the mobile phone have been verified, then SIM operations conforming to the international standard are carried out. In other words, the mobile phone will be locked out and all functions thereof are disabled except the function of making an emergency call (SOS) until a user inputs the right unlock code.

Figure 2:
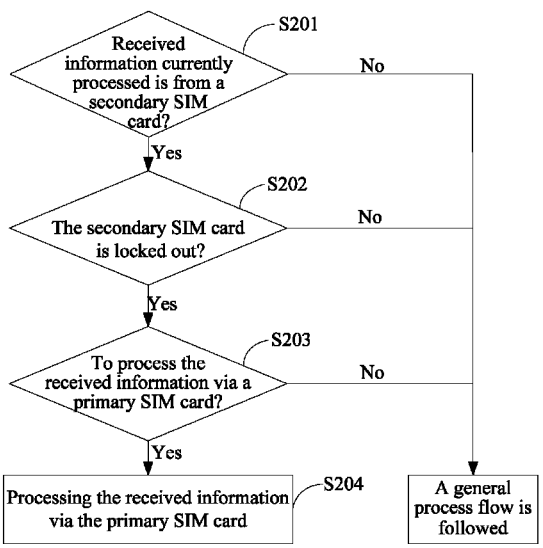
FIG. 2 is a flowchart diagram of a received information processing method for a mobile phone according to an embodiment of the present disclosure.

FIG. 2 illustrates a flowchart diagram of a received information processing method for a mobile phone according to an embodiment of the present invention.

In step S201, it is determined whether received information being processed is from a secondary SIM card of the mobile phone. If the answer is yes, then the method proceeds to step S202; and otherwise, a general process flow will be followed.

In practical implementations, a destination address comprised in the received information is acquired firstly, and the destination address is compared with address information of a primary SIM card. If the destination address is inconsistent with the address information of the primary SIM card, then it is determined that the information is from the secondary SIM card of the mobile phone.

Of course, the destination address comprised in the received information may also be compared with an address of the secondary SIM card, and this will not be further described herein.

In step S202, it is determined whether the secondary SIM card is locked out. If the answer is yes, the method proceeds to step S203; and otherwise, the general process flow will be followed.

However, in practical implementations, step S201 and step S202 can be executed simultaneously, or step S201 can be executed after step S202.

In step S203, a user is prompted to choose whether to process the received information via the primary SIM card. If the user choice is yes, then the method proceeds to step S204; and otherwise, the general process flow will be followed.

In step S204, the received information is processed via the primary SIM card.

In practical implementations, the present disclosure sets a destination server address of the received information being processed as a destination server address of the primary SIM card. For example, when a short message from the secondary SIM card is replied via the primary SIM card, the destination server address of the short message being edited for reply is set as the destination server address of the primary SIM card. In other words, the Service Center Address (TS-SC) among parameters of the short message is assigned as the value of the Short Message Service Center (SMSC) of the primary SIM card.

Preferably, the received information is a short message.

According to this embodiment of the present disclosure, if the secondary SIM card of the mobile phone is locked out and a short message from the secondary SIM card needs to be replied or forwarded, then the received information from the secondary SIM card can be processed via the primary SIM card in time. This represents great convenience for users.

Figure 3:
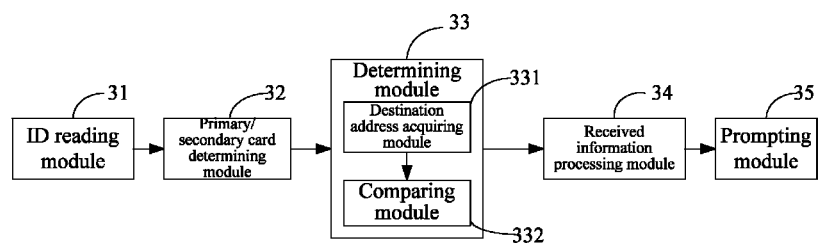
FIG. 3 is a functional block diagram of a mobile phone according to an embodiment of the present disclosure.

FIG. 3 illustrates a structure of a mobile phone according to an embodiment of the present invention.

An ID reading module 31 reads an ID of each of SIM cards in the mobile phone one by one.

A primary/secondary card determining module 32 determines whether the ID of the SIM card read by the ID reading module 31 exists in a pre-stored license code list. If the ID of the SIM card exists in the pre-stored license code list, then the SIM card is determined to be a primary SIM card; and otherwise, the SIM card is determined to be a secondary SIM card.

When there is received information to be processed, a determining module 33 determines whether the received information to be processed is from the secondary SIM card. If the answer is yes, then the determining module 33 further determines whether the secondary SIM card is locked out.

If the determining module 33 determines that the received information to be processed is from the secondary SIM card and the secondary SIM card is locked out, then a choosing module 34 prompts a user to choose whether to process the received information via the primary SIM card of the mobile phone.

When the user chooses to display the information via the primary SIM card of the mobile phone, a received information processing module 35 displays the information via the primary SIM card.

In practical implementations, the received information processing module 35 sets a destination server address of the received information being processed as an address of the primary SIM card. Of course, the received information may also be processed in other ways, which will not be further described herein.

More preferably, the determining module 33 comprises a destination address acquiring module 331 and a comparing module 332. The destination address acquiring module 331 acquires a destination address comprised in the information. The comparing module 332 compares the destination address with address information (e.g., MSISDN) of the primary SIM card. If the destination address is inconsistent with the address information of the primary SIM card, then it is determined that the information is from the secondary SIM card.

Preferably, the received information is a short message.

According to this embodiment of the present disclosure, if the secondary SIM card of the mobile phone is locked out and a short message from the secondary SIM card needs to be replied or forwarded, then the received information from the secondary SIM card can be processed via the primary SIM card in time. This represents great convenience for users.

What described above are only some of the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A mobile phone, comprising:
   a memory;
   a processor coupled to the memory;
   one or more programs stored in the memory and executable by the processor, the one or more programs comprising:
   an identity (ID) reading module, being configured to read a Mobile Network Code (MNC) and a Mobile Country Code (MCC) of each of subscriber identity module (SIM) cards in the mobile phone one by one;
   a primary/secondary card determining module, being configured to only determine whether the MNC and the MCC of the SIM card exist in a pre-stored license code list, if the MNC and the MCC of the SIM card exist in the pre-stored license code list, then the SIM card is determined to be a primary SIM card, and if the MNC and the MCC of the SIM card do not exist in the pre-stored license code list, the SIM card is determined to be a secondary SIM card, such that the primary SIM card is satisfied with a standard defined by a communication operator of the mobile phone, and the secondary SIM card is not satisfied with the standard defined by the communication operator of the mobile phone, and satisfied with an another standard defined by an another communication operator;
   a determining module, being configured to determine whether a short message being processed is from the secondary SIM card of the mobile phone and whether the secondary SIM card is locked out because the secondary SIM card is not satisfied with the standard defined by the communication operator of the mobile phone, wherein the determining module comprising:
      a destination address acquiring module, being configured to acquire a destination address comprised in the short message; and
      a comparing module, being configured to compare the destination address with address information of the primary SIM card, wherein if the destination address is inconsistent with the address information of the primary SIM card, then it is determined that the short message is from the secondary SIM card;
   a choosing module, being configured to, if the short message is from the secondary SIM card of the mobile phone and the secondary SIM card is locked out because the secondary SIM card is not satisfied with the standard defined by the communication operator of the mobile phone, prompt a user to choose whether to process the short message via the primary SIM card of the mobile phone; and
   a received information processing module, being configured to process the short message via the primary SIM card when the user chooses to process the short message via the primary SIM card of the mobile phone.

2. The mobile phone of claim 1, wherein the received information processing module is further configured to set a destination server address of the short message being processed as a destination server address of the primary SIM card.

3. The mobile phone of claim 1, wherein the received information is a short message.

4. A received information processing method for a mobile phone, comprising the following steps of:
   identifying a primary subscriber identity module (SIM) card and a secondary SIM card by reading a Mobile Network Code (MNC) and a Mobile Country Code (MCC) of each of the SIM cards in the mobile phone one by one and only determining whether the MNC and MCC of the SIM card exist in a pre-stored license list, wherein if the MNC and the MCC of the SIM card exist in the pre-stored license list, then the SIM card is determined as the primary SIM card; and if the MNC and the MCC of the SIM card do not exist in the pre-stored license code list, then the SIM card is determined as the secondary SIM card, such that the primary SIM card is satisfied with a standard defined by a communication operator of the mobile phone, and the secondary SIM card is not satisfied with the standard defined by the communication operator of the mobile phone, and satisfied with an another standard defined by an another communication operator;

determining whether received information being currently processed is from the secondary SIM card of the mobile phone and determining whether the secondary SIM card is locked out because the secondary SIM card is not satisfied with the standard defined by the communication operator of the mobile phone, wherein the step of determining whether received information being currently processed is from the secondary SIM card of the mobile phone, comprising:

acquiring a destination address comprised in the received information; and comparing the destination address with address information of the primary SIM card, wherein if the destination address is inconsistent with the address information of the primary SIM card, then it is determined that the received information is from the secondary SIM card;

if the received information is from the secondary SIM card of the mobile phone and the secondary SIM card is locked out because the secondary SIM card is not satisfied with the standard defined by the communication operator of the mobile phone, then waiting for a user choice of whether to process the received information via the primary SIM card of the mobile phone; and if the user choice is to process the received information via the primary SIM card of the mobile phone, then processing the received information via the primary SIM card.

5. The received information processing method for a mobile phone of claim 4, wherein the step of processing the received information via the primary SIM card comprises the following step of:

setting a destination server address of the received information being processed as a destination server address of the primary SIM card.

6. The received information processing method for a mobile phone of claim 4, wherein the received information is a short message.

\* \* \* \* \*